(12) United States Patent
Vaaler et al.

(10) Patent No.: US 11,473,220 B2
(45) Date of Patent: Oct. 18, 2022

(54) FIBERS FABRICATED WITH METALS INCORPORATED INTO GRAIN BOUNDARIES FOR HIGH TEMPERATURE APPLICATIONS

(71) Applicants: Erik Garth Vaaler, Redwood City, CA (US); Marvin S Keshner, Sonora, CA (US); Shay Harrison, East Greenbush, NY (US)

(72) Inventors: Erik Garth Vaaler, Redwood City, CA (US); Marvin S Keshner, Sonora, CA (US); Shay Harrison, East Greenbush, NY (US)

(73) Assignee: Free Form Fibers LLC, Saratoga Springs, NY (US)

( * ) Notice: Subject to any disclaimer, the term of this patent is extended or adjusted under 35 U.S.C. 154(b) by 0 days.

(21) Appl. No.: 17/000,858

(22) Filed: Aug. 24, 2020

(65) Prior Publication Data
US 2020/0392648 A1 Dec. 17, 2020

Related U.S. Application Data (63) Continuation-in-part of application No. 15/612,251, filed on Jun. 2, 2017, now Pat. No. 10,815,588.

(51) Int. Cl.
| | | |
|---|---|---|
| *B32B 9/00* | (2006.01) | |
| *D01F 11/12* | (2006.01) | |
| *D01F 9/12* | (2006.01) | |
| *D01F 11/16* | (2006.01) | |
| *C04B 35/628* | (2006.01) | |
| *C04B 35/565* | (2006.01) | |
| *C04B 35/583* | (2006.01) | |
| *D01F 9/127* | (2006.01) | |
| *D02G 3/00* | (2006.01) | |

(52) U.S. Cl.
CPC .......... *D01F 11/127* (2013.01); *C04B 35/565* (2013.01); *C04B 35/583* (2013.01); *C04B 35/62849* (2013.01); *C04B 35/62884* (2013.01); *D01F 9/12* (2013.01); *D01F 11/16* (2013.01); *C04B 2235/3418* (2013.01); *C04B 2235/386* (2013.01); *C04B 2235/3826* (2013.01); *C04B 2235/421* (2013.01); *C04B 2235/422* (2013.01); *C04B 2235/85* (2013.01)

(58) Field of Classification Search
USPC ................................ 428/358, 364, 367, 368
See application file for complete search history.

(56) References Cited

U.S. PATENT DOCUMENTS 4,141,726 A * 2/1979 Yajima .................... C22C 49/04
75/229

* cited by examiner

*Primary Examiner* — James E McDonough
(74) *Attorney, Agent, or Firm* — Shalini Venkatesh (57) ABSTRACT

A fiber comprises a bulk material comprising: one or more of carbon, silicon, boron, silicon carbide, and boron nitride; and a metal or metal alloy whose affinity for oxygen is greater than that of the bulk material. At least a first portion of the metal or metal alloy is present at the entrance to grain boundaries at the surface of the fiber and within the fiber to a depth of at least 1 micron from the fiber surface.

A method of improving a fiber comprises heating a fiber in an inert atmosphere to 900-1300 C for sufficient time to allow at least some of a metal or metal alloy, placed on the fiber, to diffuse and/or flow into and along grain boundaries to a depth of at least 1 micron. The metal or metal alloy has a greater affinity for oxygen than that of the fiber bulk material.

7 Claims, 11 Drawing Sheets

FIBERS FABRICATED WITH METALS INCORPORATED INTO GRAIN BOUNDARIES FOR HIGH TEMPERATURE APPLICATIONS

CROSS-REFERENCES TO RELATED APPLICATIONS

This application is a Continuation-in-Part of U.S. application Ser. No. 15/612,251, filed 2 Jun. 2017, which is incorporated by reference as if set forth in full in this application for all purposes.

FIELD OF INVENTION

This invention relates in general to fibers intended to withstand high temperatures, and more specifically to fibers designed and fabricated to have improved strength and toughness for their target high temperature applications.

BACKGROUND

Small diameter fibers made of carbon, silicon carbide, boron and other materials are finding application in composite materials, in which the fibers are embedded in a matrix of glass, silicon carbide, epoxy, or other materials that bond to the fibers. Some particularly attractive applications require a tolerance to very high temperatures, well in excess of 1000 C. At these high temperatures, there is a tendency for any oxygen that may be present in the fibers, and especially at grain boundaries in the fibers, to react with the fiber material and greatly reduce the tensile or compressive strength and the shock resistance (fracture toughness) of the fiber. Also, at these high temperatures, oxygen, nitrogen and/or water vapor present in the local environment can diffuse into the fibers and greatly reduce their strength and toughness. The oxygen, water vapor, etc can attack the fiber material at a grain boundary, defect, dislocation or other stress point and promote corrosion of the material to form a stress induced, corrosion accelerated, crack in the fiber. Once initiated, these cracks can quickly lead to total failure of the fiber.

Figure 1:
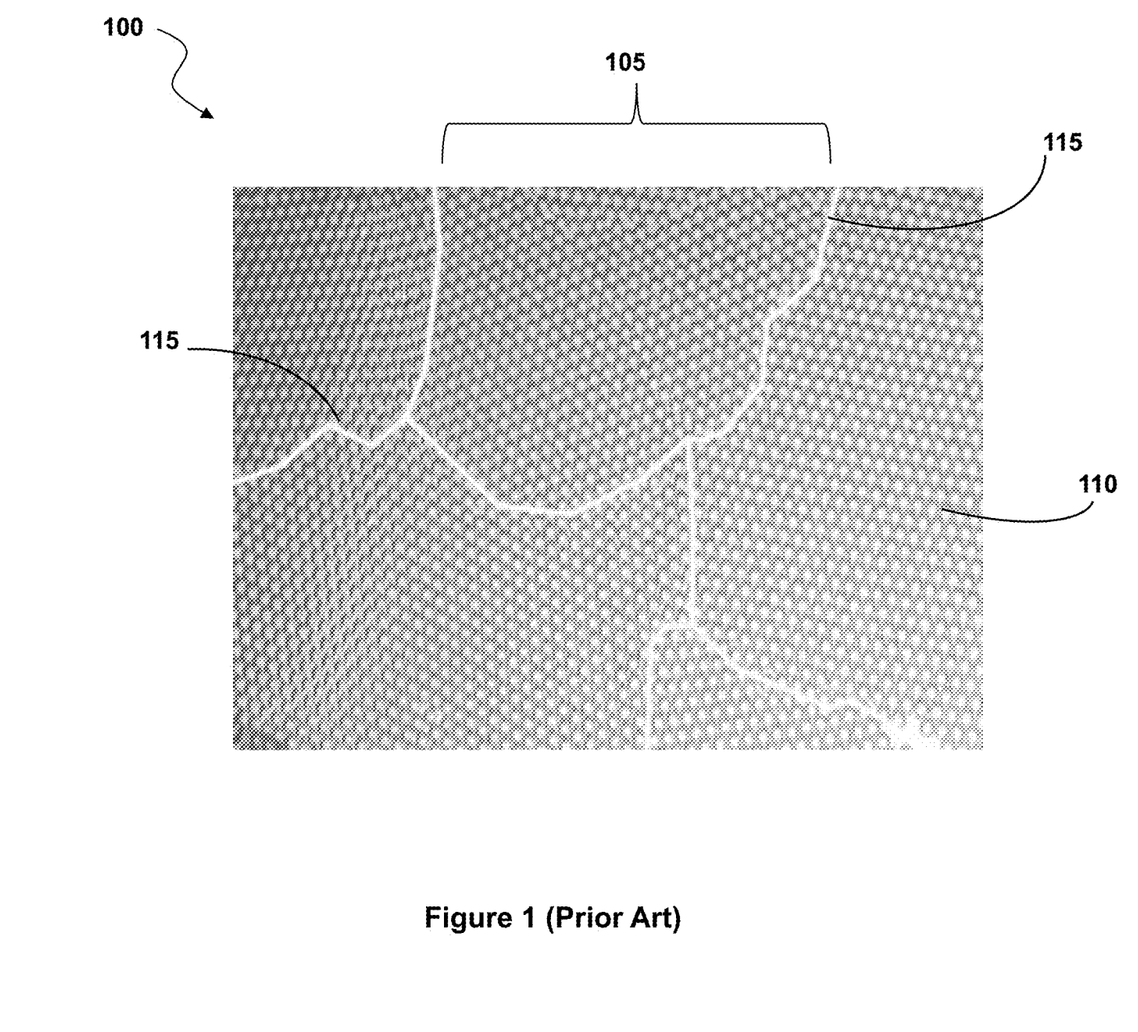
FIG. 1 (Prior Art) illustrates part of a fiber prior to or in the absence of modification by the present invention.

FIG. 1 is a cross sectional view through a fiber 100 of the type currently used in the applications of interest. The figure shows parts of five grains 105 of the bulk fiber material 110, with ordered arrangements of atoms (the white circles), and grain boundaries 115 between the grains. For the purpose of illustration, FIG. 1 and other figures show a fiber with a rectangular cross-section. However, the cross-section of the fiber can be round, oval or other shapes.

One current approach to protecting such fibers is to use coatings of boron nitride. Unfortunately, at high temperatures, boron nitride coatings themselves tend to oxidize to form boron oxide and nitrous oxides, neither of which offers significant protection for the encapsulated fibers. Another possible approach, relevant to some specific fiber types, is to simply deposit a thick layer of a metal onto the fiber. However, if the coating is a metal, it will oxidize quickly at high temperatures and become an oxide, and the thermal expansion coefficient of metals and metal oxides is very high compared to carbon, boron or silicon carbide fibers. A large mismatch of thermal expansion coefficients will create huge stress on the fiber and quickly cause mechanical failure at high temperatures. There is, therefore, a need to develop better chemical composition, structure, and fabrication techniques for fibers intended for high temperature operation. Ideally the improved fibers would be less liable to degradation from the effects of oxygen and nitrogen (present either within the fibers or in the local environment) and of water vapor and other species present in the local environment). It would also be desirable to minimize the amount of any added material, keeping cost and weight of the improved fibers acceptably low.

SUMMARY

The present invention includes a fiber comprising: a bulk material comprising one or more materials selected from the group consisting of carbon, silicon, boron, silicon carbide, and boron nitride; and a metal whose affinity for oxygen is greater than the affinity for oxygen of any of the one or more materials. In one aspect of the invention, the metal is selected from the group consisting of beryllium, titanium, hafnium and zirconium. In another aspect of the invention, at least a first portion of the metal is present in unoxidized form at the entrance to and/or within grain boundaries within the fiber.

In another embodiment, the present invention includes a method of improving at least one of the strength, creep resistance, and toughness of a fiber. The method comprises adding to a fiber, initially comprising a bulk material having a first affinity for oxygen, a metal that has a second affinity for oxygen higher than the first affinity. In one aspect of the invention, the metal is selected from the group consisting of beryllium, titanium, hafnium and zirconium. In another aspect of the invention, the addition comprises: placing the metal on a surface of the fiber; and, in a heating step, heating the fiber in an inert atmosphere to 900-1300 C for sufficient time to allow the metal to diffuse and/or flow to and into grain boundaries within the fiber.

DETAILED DESCRIPTION

Small diameter fibers that are used to make composite materials are typically made up of elements such as carbon, boron, silicon, titanium, etc. Unfortunately, such materials have a high affinity for oxygen and in applications at high temperature (well above 1000 C) are susceptible to degradation by oxygen, nitrogen or water vapor. Oxygen present within the fibers or oxygen and water vapor in the atmosphere around the fiber readily combine with the fiber material to form oxides such as carbon dioxide, boron trioxide, or silicon dioxide. Oxidation of the fiber material weakens the fiber by reducing its tensile and compression strength and by making it more brittle (less tough), and less able to tolerate concentrations of stress.

This invention aims to improve the strength and/or toughness of such fibers by modifying their structure. More specifically, the present invention incorporates into the structure of the fibers a metal chosen on the basis of having an even greater affinity for oxygen than the bulk materials from which the fiber is made. Good choices for the added metal include beryllium, hafnium, zirconium, and titanium.

Figure 2:
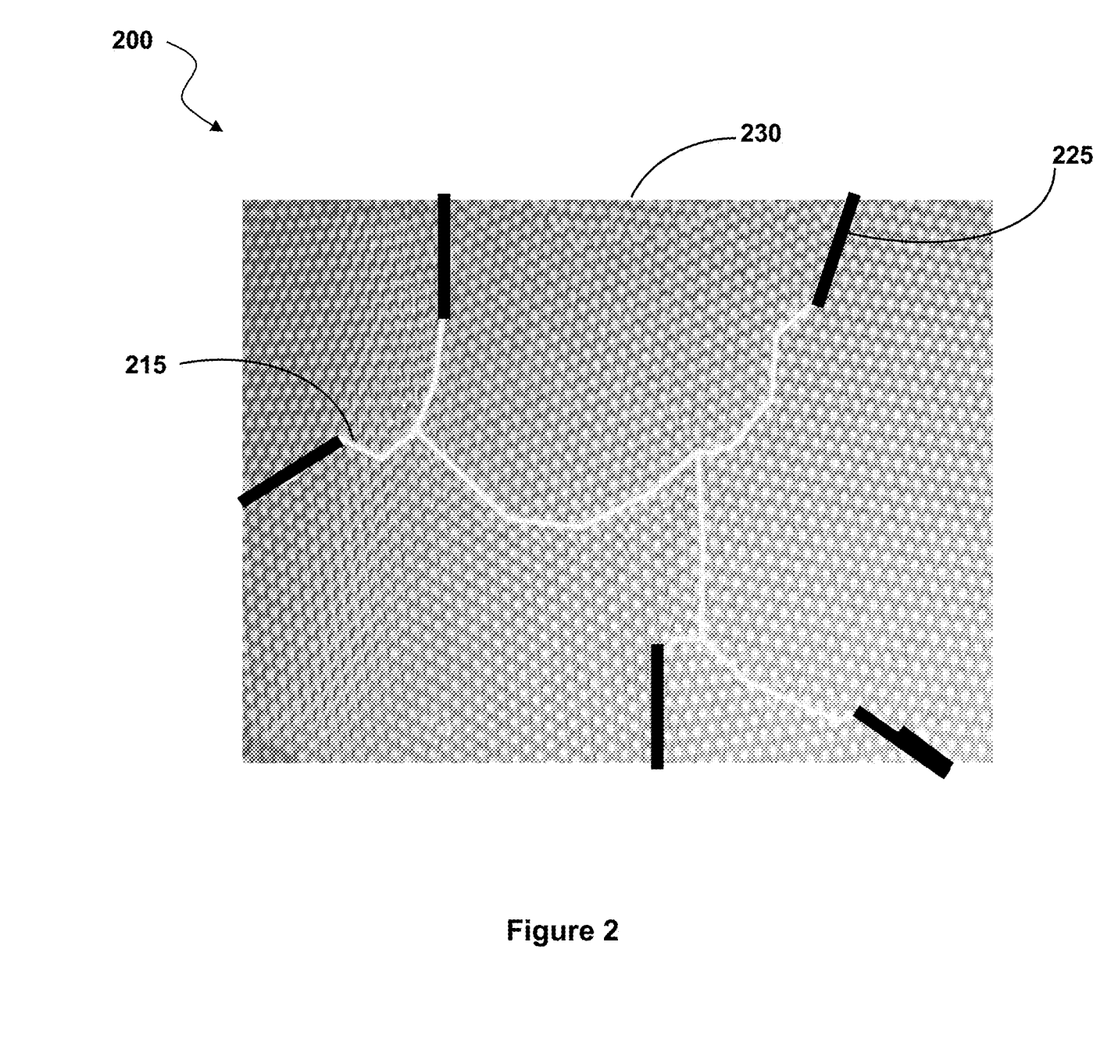
FIG. 2 illustrates part of a fiber according to one embodiment of the present invention.

In one embodiment, the chosen metal is placed at the entrance to and into the grain boundaries of the fiber. FIG. 2 is a cross sectional view through a fiber 200 according to one embodiment of the present invention, showing the chosen metal 225 present at the entrances of and penetrating well into the depths of grain boundaries 215. This structure can be created by coating the chosen metal onto the outer surface 230 of the fiber and then heating the coated fiber in an inert atmosphere (such as argon) to allow some or all of the chosen metal to diffuse from the surface into the grain boundaries.

Once inside a grain boundary, the metal captures oxygen present in the grain boundary and nearby oxygen that can diffuse out of the bulk material to the grain boundary. Once captured, the oxygen remains bound to the chosen metal as a stable metal oxide. A portion of the metal may remain present within the grain boundary in unoxidized form. The metal and its oxide also act as a seal or barrier layer in the grain boundary, preventing oxygen or nitrogen from entering the grain boundary from the environment around the fiber, and attacking the fiber during high temperature operation.

Figure 3:
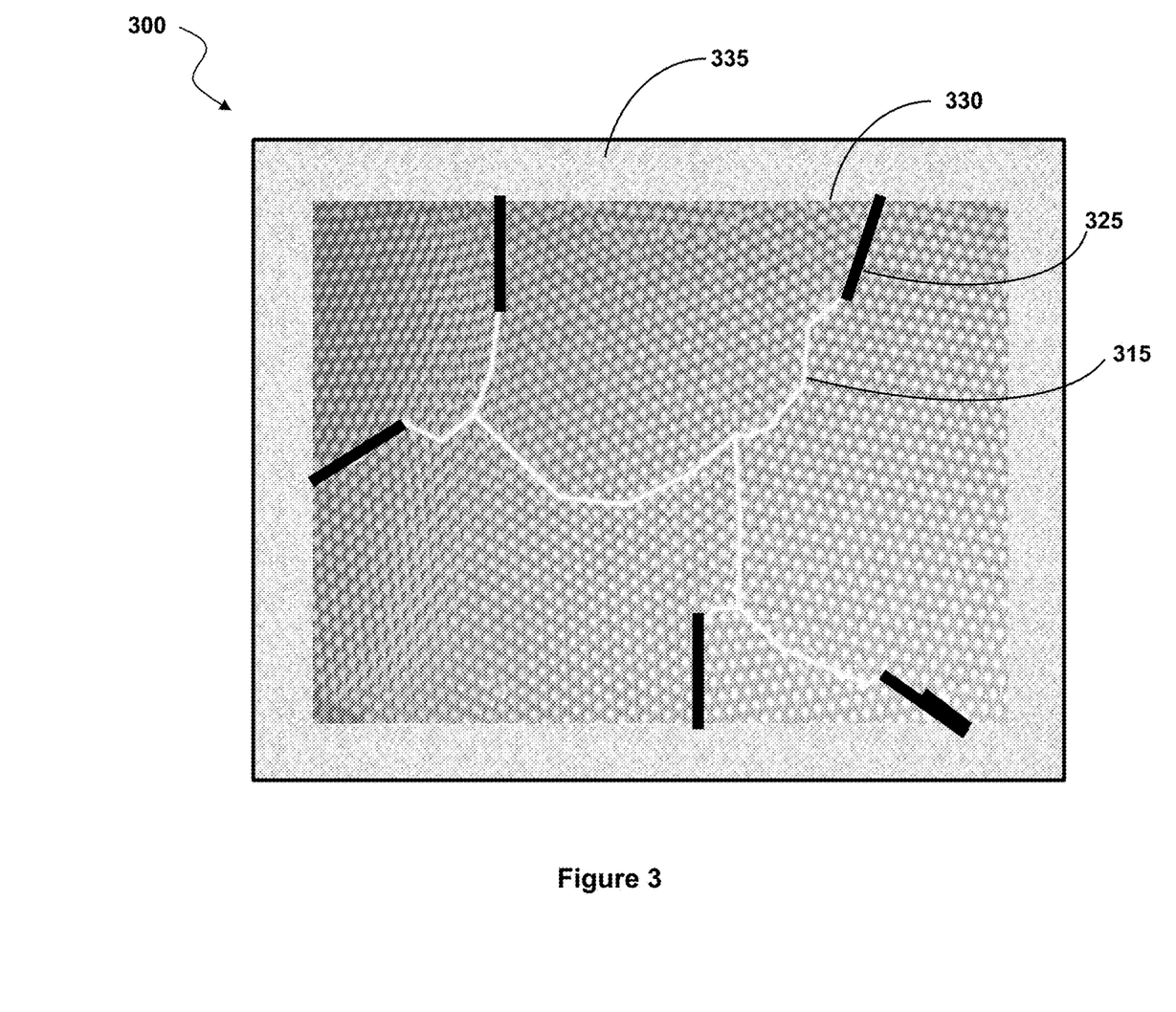
FIG. 3 illustrates part of a fiber according to one embodiment of the present invention.

In another embodiment, illustrated in FIG. 3, a fiber 300 has the chosen metal present in the form of a metal oxide barrier layer 335 on the surface 330 of the fiber to prevent diffusion of oxygen and nitrogen at high temperatures from the surface into the bulk of the fiber. To create such a fiber, the chosen metal is placed on the surface 330 of the fiber and then oxidized to convert it into the required stable oxide diffusion barrier 335. In a variation of this embodiment, also shown in FIG. 3, the same metal 325 is placed at the entrance to and within the grain boundaries 315, as well as on the surface 330 of the fiber, prior to the oxidation process which forms oxide barrier layer 335.

Figure 4:
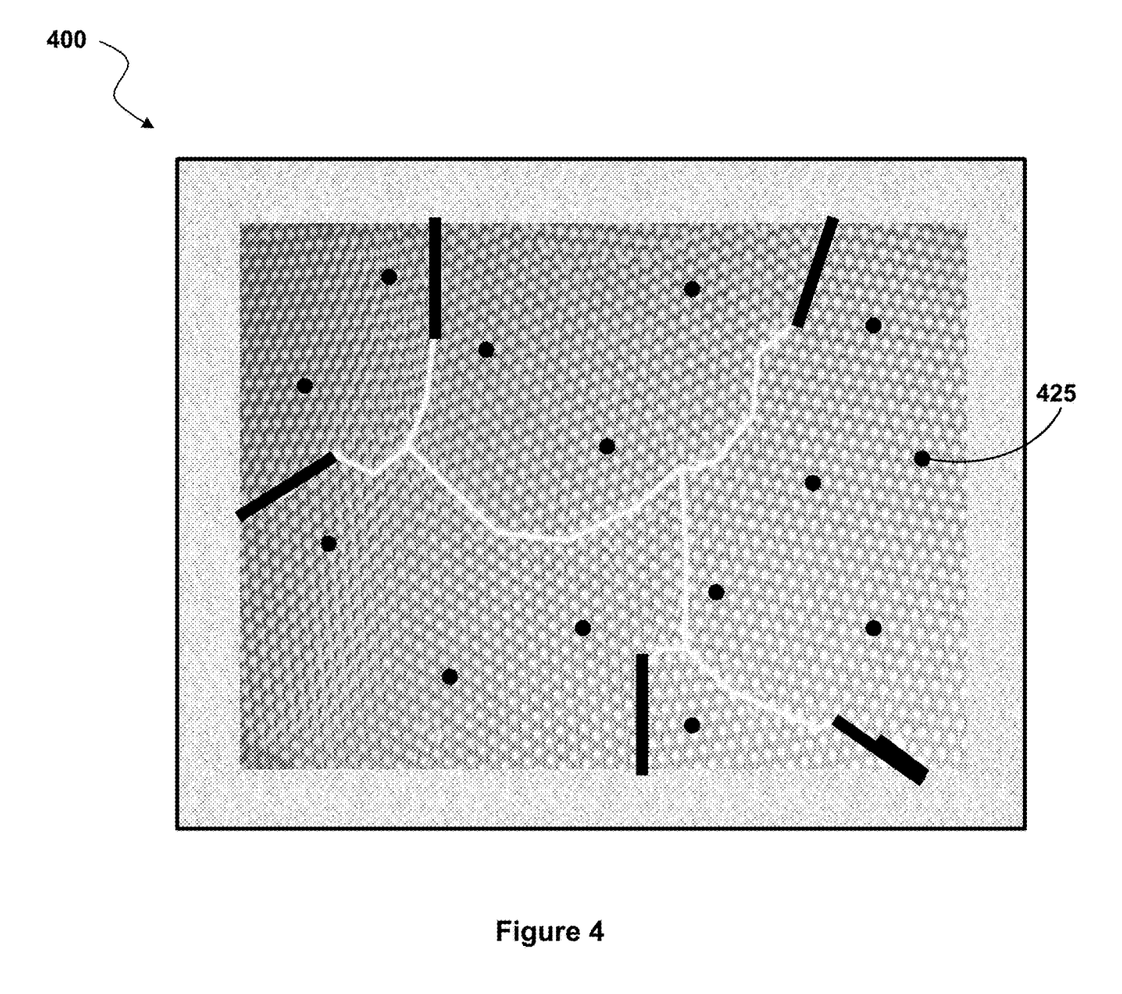
FIG. 4 illustrates part of a fiber according to one embodiment of the present invention.

In yet another embodiment, illustrated in FIG. 4, the atoms of the chosen metal 425 are incorporated as a dilute impurity into the bulk of the fiber material. When placed inside the crystalline grains that make up the fiber, the metal atoms can attract and bond with impurities like oxygen to strengthen and/or toughen the material. For some fiber compositions, like carbon or silicon-carbide fibers, the metal atoms can also form metal carbide complexes that can pin the grain boundaries and strengthen and/or toughen the material.

This type of incorporation as an impurity can be done in combination with the sealing of the grain boundaries and/or with the sealing of the fiber surface with a metal oxide. However, each of the three structural modifications of the fiber illustrated in FIGS. 2, 3 and 4, and described above also can be implemented independently of each other.

To be useful, the oxide of the chosen metal that seals the entrance to the grain boundaries and/or the surface of the fiber should have a melting temperature significantly greater than the melting temperature of the fiber or at least significantly greater than the highest temperature required by the application. It must also have a close match to the coefficient of thermal expansion of the fiber. Otherwise, the presence of an oxide on the surface of the material, in the grain boundaries, or within the bulk of the material could stress the material (or the oxide) and cause a crack to form. This stable oxide must also provide a strong diffusion barrier to protect the fiber at high temperatures against diffusion of oxygen, water vapor, or nitrogen from the air outside of the fiber to the bulk material inside.

One excellent choice for the metal to bind with the oxygen in the fiber and form a stable oxide with an appropriate coefficient of thermal expansion is beryllium, which oxidizes to form beryllium oxide (BeO). This material can be the chosen metal for inserting into the grain boundaries, and also the chosen metal that is placed on the fiber surface and converted to an oxide that will protect the bulk material of the fiber.

Beryllium has one of the highest affinities for oxygen of any element. Per mole of oxygen atoms, BeO has a heat of formation of 610 kJ. This is much greater than the heats of formation for the materials of which the fibers are made. For example, per mole of oxygen atoms, CO or CO2 has a heat of formation of 111 or 193 kJ., SiO2 has one of 430 kJ, and B2O3 has one of 418 kJ. Other good choices for a chosen metal might include Aluminum, Titanium, Zirconium, and Hafnium metals, whose oxides (Al2O3, TiO2, ZrO2, and HfO2 respectively) have values well above those for CO or CO2, but still significantly less than BeO (at 527, 470, 510 and 550 kJ per mole of oxygen atoms, respectively).

Figure 5:
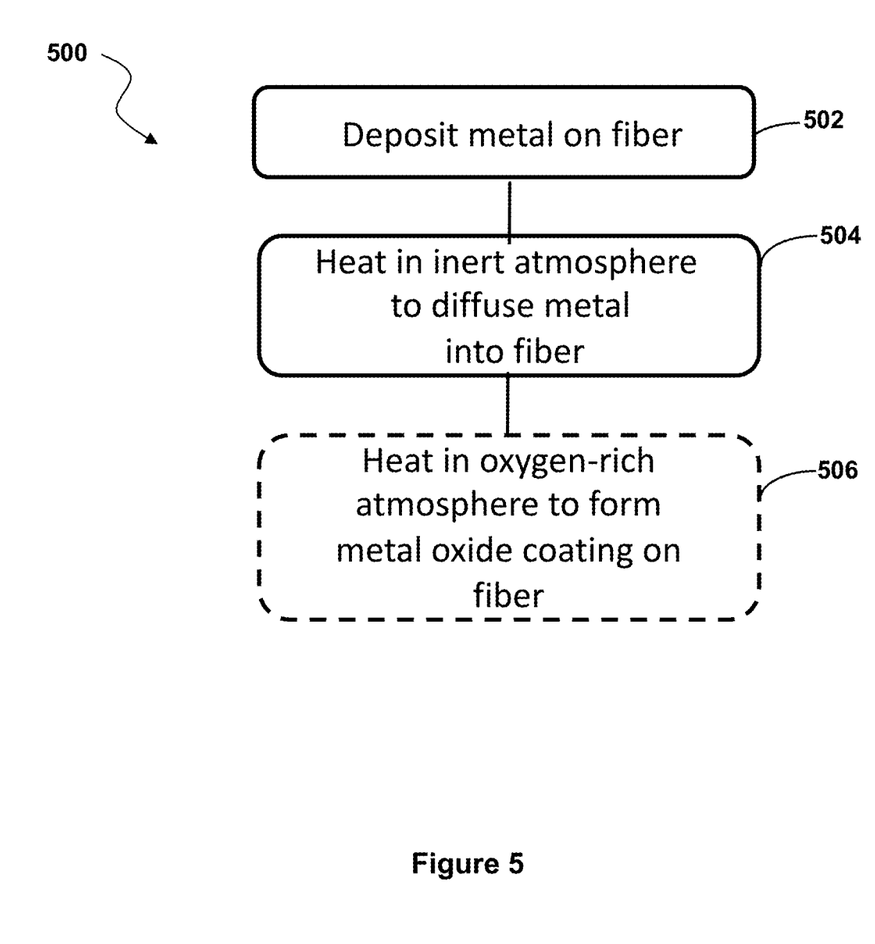
FIG. 5 is a flowchart showing steps of a method according to some embodiments of the present invention.

In some embodiments, a three-step process 500, illustrated in FIG. 5, is used to incorporate the high oxygen affinity material of choice (e.g. Be, Al, Zr, Hf etc) into the grain boundaries of the fibers. First, at step 502, the metal is deposited on the surface of the fiber. Second, at step 504, the fiber is held at a first high temperature in an inert atmosphere (eg. Ar) to allow the metal to diffuse into the fiber and especially into the grain boundaries. Third, at step 506, the fiber is exposed to oxygen and/or water vapor at a second high temperature to convert the metal remaining at the surface of the fiber into a corresponding stable oxide forming the desired oxide barrier on the surface of the fiber. In some embodiments, the amount of the high oxygen affinity material deposited in the first step is so small that there is just enough to diffuse into the grain boundaries, and little or no coating remains to form an oxide on the surface of the fiber. For these cases, the third step of exposing the fiber to oxygen at the second high temperature after the diffusion step is not required.

During first step 502, the chosen metal can be deposited using sputtering, evaporation, chemical vapor deposition (CVD) or other well-known methods. In cases where beryllium metal is the material of choice, and CVD is used, any of a number of beryllium containing gases can be used as precursors, including BeF2, BeCl2, di-methyl-beryllium, etc.

During step 504, after the fibers are coated, they are held at a moderately high temperature, in the range 900-1300 C, in vacuum or an inert atmosphere, (eg. Ar). This high temperature process step proceeds long enough to allow the chosen metal to diffuse and/or flow to and into the grain boundaries and to allow the oxygen to diffuse out of the grain boundaries or bulk material and combine with the chosen metal. In cases where beryllium is the material of choice, some of the beryllium metal may absorb the oxygen and form BeO. In addition to pulling oxygen out of the grain boundaries and bulk material of the fiber, this high temperature step also allows any weakly bonded carbon, boron, silicon or other impurities located at or near the grain boundaries to combine with the Be metal to form carbides, borides, silicides etc.

Once formed, the oxides, carbides, borides or silicides can act to pin and protect the grain boundaries and strengthen the fibers. They also act to seal the grain boundaries against further attack by oxygen, water vapor, or nitrogen from the air outside the fiber at high temperatures. Any unoxidized beryllium (or whichever other chosen metal is used) that has diffused and/or flowed into the grain boundaries will also serve a role in sealing the grain boundaries against these elements.

By pinning the grain boundaries, creep of the fiber under stress is reduced, especially at high temperatures. By sealing the grain boundaries, mechanical strength and toughness are increased. Stress concentration at micro-cracks is reduced. The formation of micro-cracks due to stress and corrosion by water vapor, nitrogen and oxygen are also reduced.

During step 506, the fiber coated with the chosen metal is maintained at a high temperature, typically in the range of 800-1200 C, and the chosen metal on the surface of the fiber is exposed to oxygen and/or water vapor. This step converts the chosen metal (e.g. beryllium) on the surface of the fiber and at the entrance to the grain boundaries to a stable oxide (e.g. BeO) which acts as an effective barrier layer. Even at very high operating temperatures (e.g. 1500 C or greater), the oxide will seal the fiber's outer surface and the fiber's grain boundaries and block the diffusion of oxygen, water vapor or nitrogen from the air outside the fiber.

In some embodiments of this invention, especially for carbon or silicon-carbide fibers, the fibers may be coated with a thin layer of silicon (0.25-5 um) prior to coating with beryllium. As described in more detail below, the layer of silicon has two functions. It prevents the diffusion of too much metal into the bulk of the fiber prior to the conversion of the metal to a metal oxide. Also, for many choices of the metal used, some of the silicon will alloy with the metal. When the alloy of the metal and silicon is oxidized, the thermal expansion coefficient of the metal-silicon oxide will be less than the oxide of the pure metal.

Figure 6:
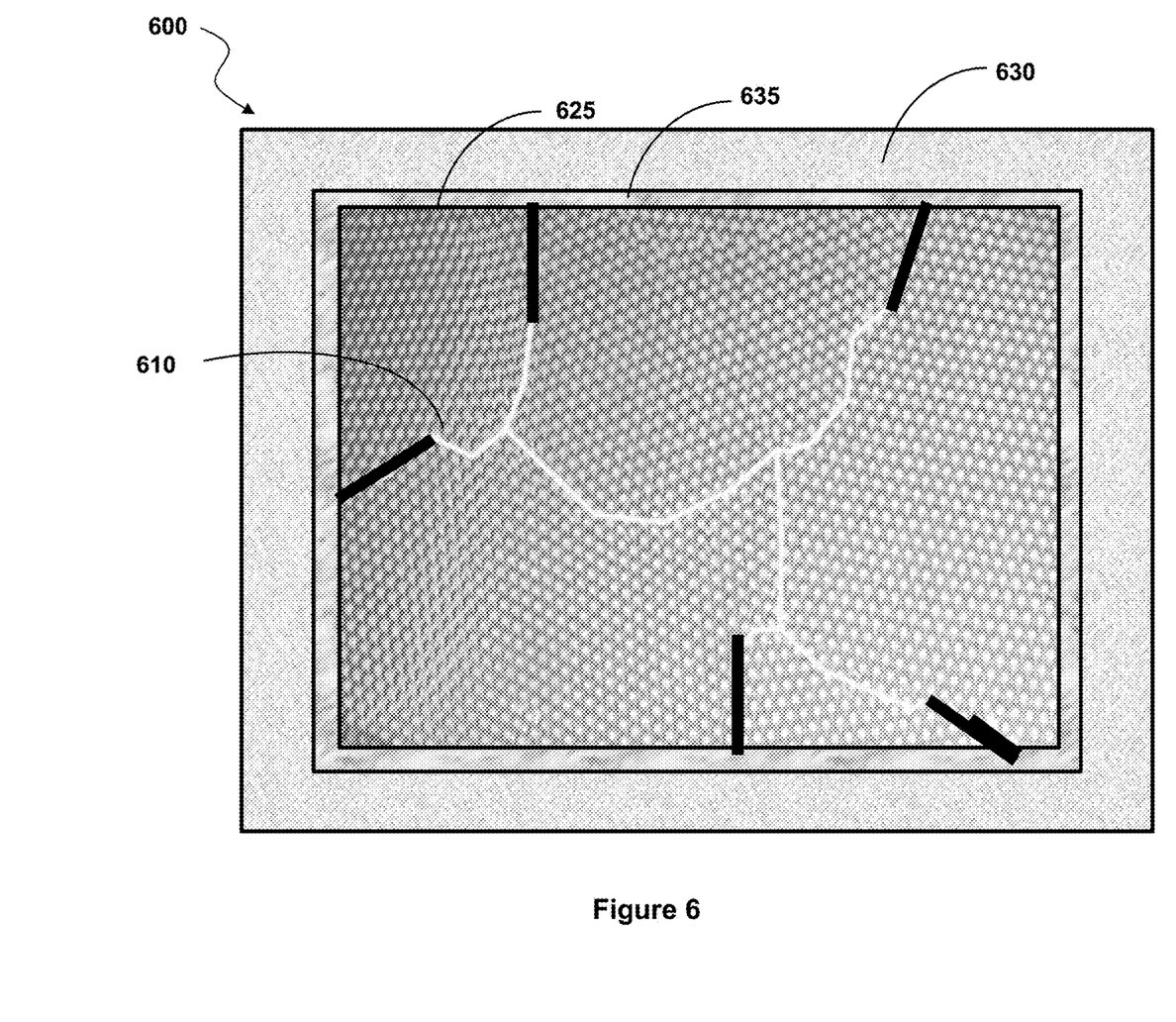
FIG. 6 illustrates part of a fiber according to one embodiment of the present invention.

In the specific case of beryllium as the chosen metal, a silicon coating has been shown to resist the diffusion of too much beryllium into the bulk carbon or silicon-carbide material. In some cases, the silicon layer has been shown to improve the overall strength of the fibers at high temperature. With the thin silicon coating, at 900-1300 C, the beryllium can still diffuse and/or flow into the grain boundaries, alloy with whatever silicon may be present, and seal the grain boundaries. The silicon may or may not diffuse there too, depending on the temperature. At temperatures up to 1100 C the Be will diffuse much faster. FIG. 6 is a cross sectional view through a fiber 600 according to such an embodiment, showing silicon layer 635 present on top of surface 625, and underneath BeO layer 630. Beryllium is also present at grain boundaries 610 in oxidized or unoxidized form, sealing them as described above.

For the oxide to be stable at operating temperatures of 1500 C or greater, we require a melting temperature of at least 2100 C. Beryllium oxide has a melting temperature of 2500 C. Oxides of silicon, titanium, and aluminum all have lower melting points. On the other hand, zirconium, yttrium and hafnium oxides also have very high melting points, well above 2100 C. However, their affinity for combining with oxygen is not as great as BeO (610 versus 510, 330 and 550 kJ per mole of oxygen atoms). Also, their coefficients of thermal expansion are too large.

Beryllium oxide has a coefficient of thermal expansion (CTE) of 5.9 ppm/C at low temperatures, rising to 10.5 ppm/C at 1500 C. This is a good match to the CTE of carbon fibers (7 ppm/C), boron fibers (5-7 ppm/C), and silicon-carbide fibers (4-5.5 ppm/C.).

In one embodiment of this invention, beryllium metal is deposited and then converted to beryllium oxide at a temperature in the range of 800-1200 C. The exact temperature will depend on the fiber that is being coated. If the temperature is too low, the oxidation rate may be too low. If the temperature is too high, the tensile stress in the coating at room temperature may be too great.

For example, with a silicon-carbide fiber, when the oxide is formed at 900 C, and then cooled to room temperature, the oxide will contract more than the fiber and be placed in tension. In cases where beryllium is the selected metal which is then converted to a coating of BeO, the amount of tensile strain is about 0.1%. The tension is just within the tensile yield strength of the BeO coating (circa 240 MPa). At temperatures above 900 C, BeO oxide expands faster than the fiber and is placed in compression. The ability of BeO to withstand compression is even greater than its ability to withstand tension (2400 MPa). The amount of compressive strain at 1500 C is about 0.3%. This is well within the compressive yield strength of the BeO coating.

In another embodiment of this invention, beryllium metal may be alloyed with silicon and then coated onto the fiber by any of the standard methods, including those mentioned above. For example, for coating with CVD, SiH4 would be added to the gas mixture. In one embodiment, the Be—Si alloy would be placed into the grain boundaries and also on the surface of the fiber. It is acceptable to use a Be—Si alloy for both the grain boundaries and the surface layer, provide that the Be concentration is well above 50%. In another embodiment, the chosen metal placed inside the grain boundaries would be pure Be and the material placed on the fiber surface would be an alloy of Be and Si. The process to create this structure could be slightly modified from the process detailed above. First, a thin layer of Be would be deposited on the fiber surface. Then, in an inert atmosphere, the fiber would be heated to allow the Be to diffuse into the grain boundaries. Then, a thicker layer of Be alloyed with Si would be applied to the surface. Finally, the fiber would be heated in an oxygen containing atmosphere to oxide the Be—Si alloy to a Be—Si oxide.

When alloyed with silicon in various amounts, the CTE of the beryllium-silicon oxide can be tuned. For example, with roughly 50% silicon, the CTE is roughly 50% of the CTE for pure beryllium oxide. A good CTE match can be obtained for carbon, boron and silicon-carbide fibers with 100% beryllium oxide. However, by adding silicon to the beryllium metal before converting the mixture to an oxide, an excellent CTE match can be obtained. Improving the CTE match will significantly reduce the amount of tensile stress in the oxide at room temp and the amount of compressive stress at very high temperatures. The beryllium/silicon oxide, just like the beryllium oxide formed when 100% beryllium is used, forms a dense diffusion barrier on the surface of the fiber and at the entrance to the grain boundaries. This dense barrier layer will prevent atmospheric oxygen, water vapor, or nitrogen from entering and weakening the fiber at high temperatures. However, beryllium/silicon oxide has a lower melting temperature than pure BeO and may not be well suited for the very highest, high temperature applications.

Zirconium dioxide has been used in the past to coat fibers. However, it has a much larger CTE, 20 ppm at 1500 C. ZrSiO4 is another material that has been used to coat fibers. It compares well with beryllium oxide with a CTE at 1500 of about 11 ppm/C. However, this CTE is still much higher than the CTE for carbon, SiC or boron fibers. Beryllium oxide alloyed with silicon dioxide is the best choice, with a CTE at 1500 C that can be tuned from 5-7 ppm/C and can almost exactly match the CTE of the various fibers likely to be encountered in the applications of interest. Hafnium oxide has a coefficient of expansion similar to that of zirconium dioxide. Titanium oxide has a CTE of about 10 at low temperatures, rising to 15 or more at high temperature. Again, beryllium oxide is a better choice, and beryllium oxide alloyed with silicon dioxide is the best choice. However, as mentioned above, beryllium-silicon oxide has a lower melting temperature than pure BeO and may or may not be well suited for very high temperature applications.

In some embodiments, a metal with a high affinity for oxygen (eg. Be) is introduced into as a dilute impurity (less than 5%) into the bulk material when the fiber is grown. This structure is illustrated in FIG. 6, where the atoms of the metal are shown as sparse dots among the atoms of the bulk material. The concentration of metal impurity atoms are sufficiently dilute to avoid significantly affecting the bulk properties of the fiber material. However, the concentration of metal atoms is large enough to effectively gather oxygen and other impurities and bind them to one of the metal atoms.

If the fiber is grown by a CVD process, the beryllium can be incorporated directly into the fiber during growth rather than being applied to a surface of the fiber after growth. In cases where beryllium metal is the material of choice, and CVD is used, any of a number of beryllium containing gases can be used as precursors, including BeF2, BeCl2, di-methyl-beryllium, etc. For carbon, boron and Si—C fibers, the beryllium atom impurities could form carbides and borides that may be pushed to the grain boundaries. At the grain boundaries, these beryllium carbide or boride precipitates will pin the grain boundaries and strengthen the fiber. On the other hand, if the Be impurities are dilute enough, they will tend to remain distributed throughout the bulk of the fiber material. If oxygen is present in the fibers during growth, the oxygen will be preferentially attracted to the beryllium atoms and form BeO. This will avoid the formation of SiO2 or CO2, which would weaken the fiber. A heat treatment after the fiber is grown may be beneficial to further enable the beryllium and oxygen to find each other in the bulk material and/or at the grain boundaries.

Additional Considerations

Many applications of interest in this field require fibers to retain their strength while operating for over 10,000 hours at very high temperatures, well in excess of 1000 C and often over 1500 C. At these high temperatures, there is a tendency for any oxygen that may be present in the fibers, and especially within grain boundaries throughout the fibers, to react with the fiber material and greatly reduce the tensile or compressive strength and the shock resistance (fracture toughness) of the fiber. Also, at these high temperatures, oxygen, nitrogen and/or water vapor present in the local environment can diffuse from the fiber surface into the fibers, especially along the grain boundaries, and greatly reduce the strength and toughness of the fibers. The oxygen, water vapor, etc. can attack the fiber material along a series of grain boundaries, defects, dislocations or other stress points and promote corrosion of the material to form a stress induced, corrosion accelerated, crack into the depth of the fiber. Once initiated, these cracks can quickly lead to total failure of the fiber.

Figure 7:
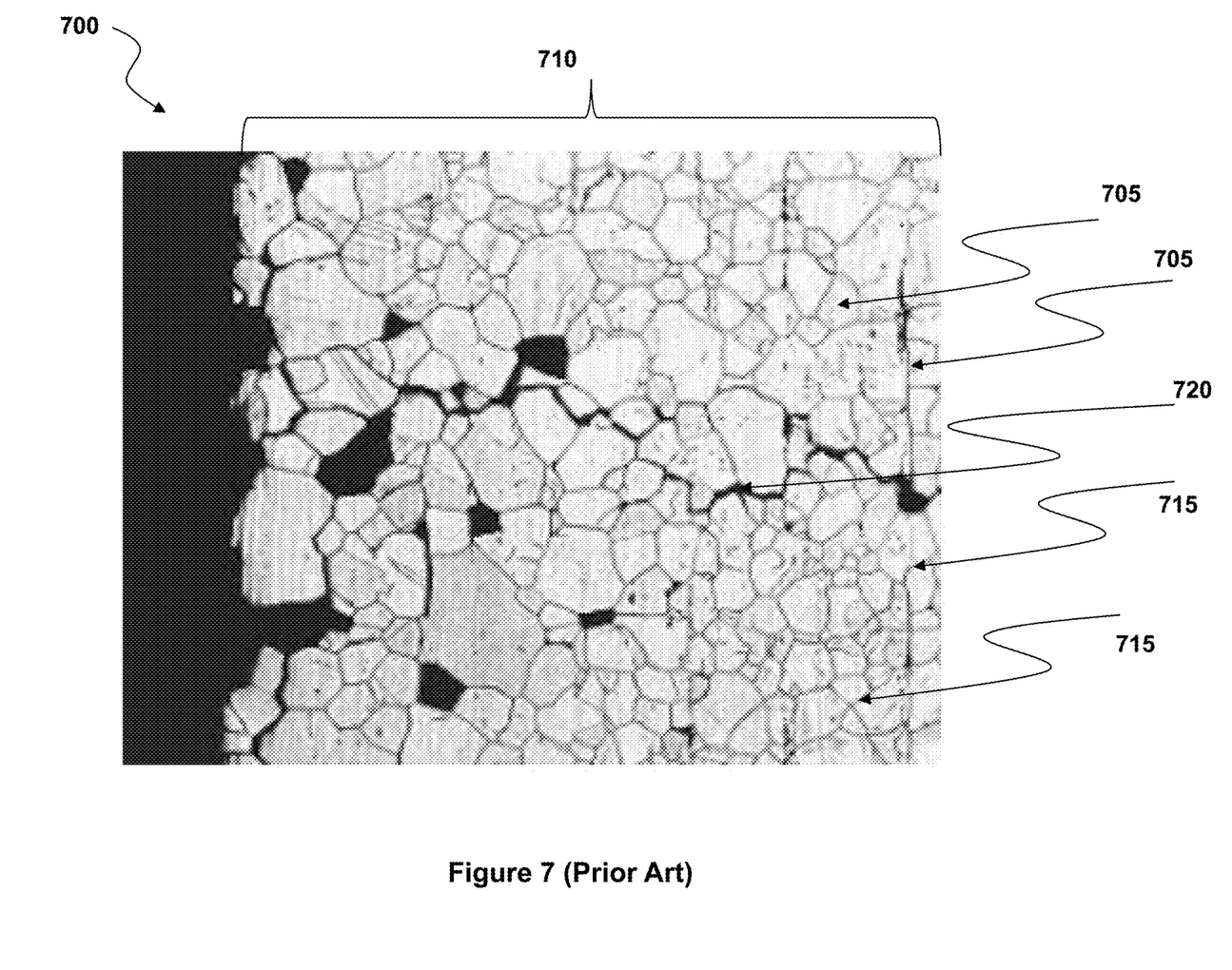
FIG. 7 (Prior Art) illustrates part of the cross-section of a fiber, showing one surface and the region immediately beneath that surface, showing numerous grains and grain boundaries prior to or in the absence of modification by the present invention.

FIG. 7 is a cross-sectional view near one edge of a fiber 700, of the same type as fiber 100 of FIG. 1, but in this case showing more detail, not just a multitude of crystalline grains 705 that form the bulk fiber material 710, and grain boundaries 715 between the individual grains, but also a connected series of grain boundaries 720 that have been widened by corrosion, starting from the surface of the fiber and penetrating into the depth of the fiber.

As briefly referred to above, one current approach to protecting fibers is to simply deposit a thin layer of a metal or another protective material onto the surface of the fiber, as in Chen. However, this metal or other protective material will not provide adequate protection at high temperatures (1000 C-1600 C), unless it is diffused deeply into the grain boundaries within the fiber. At high temperatures, and over many thousands of hours of operating time, oxygen is able to diffuse through the grains of material at the surface of the fiber and enter the grain boundaries within the fiber, whose open structure enable it to move deeply into the fiber and cause damage.

The present invention includes a fiber comprising: a bulk material comprising one or more materials selected from the group consisting of carbon, silicon, boron, silicon carbide, and boron nitride; and a metal or alloy of metals whose affinity for oxygen is greater than the affinity for oxygen of any of the one or more materials. The metal or metal alloy is diffused into and along the grain boundaries, to a depth of at least one micron, and typically several microns into the fiber from all surfaces. In one embodiment, the present invention includes a method of improving at least one of the strength and toughness of a fiber. The method comprises adding to a fiber, initially comprising a bulk material having a first affinity for oxygen, a metal or metal alloy that has a second affinity for oxygen higher than the first affinity and diffusing that metal or metal alloy into and along the grain boundaries, at least 1 micron and typically several microns into the fiber from all surfaces. In one aspect of the method, the addition comprises: placing the metal or metal alloy on a surface of the fiber; and, in a heating step, heating the fiber in an inert atmosphere to 900-1300 C for sufficient time to allow the metal or metal alloy to diffuse and/or flow into and along the grain boundaries to a depth of at least 1 microns, and typically 2-5 microns within the fiber.

The fibers used to make composite materials are typically less than 200 microns in diameter. Many are 20-50 um in diameter. The materials of which they are made up typically have a high affinity for oxygen, and in applications at high temperature (well above 1000 C or above 1500 C) for many thousands of hours, they are susceptible to degradation by oxygen, nitrogen or water vapor. At high operating temperatures (1000 C-1600 C), oxygen or water vapor in the atmosphere around the fiber can diffuse several microns through the grains at the surface of the fibers and several tens of microns along the connected grain boundaries between grains within the fiber. Oxidation of the fiber material, especially at the grain boundaries, widens the grain boundaries, forming cracks in the fiber. These cracks concentrate stress and weaken the fiber, reducing its tensile and compression strength and making it more brittle (less tough), and less able to tolerate shocks or stress.

The metal or alloys of metals incorporated into the structure of the fibers in the present invention is chosen on the basis of having an even greater affinity for oxygen than the bulk materials from which the fiber is made. Thus, the incorporated metal preferentially absorbs and combines with oxygen and attracts it away from the fiber material and away from the grain boundaries of the fiber material. Good choices for the added metal include beryllium, titanium, aluminum, hafnium, and zirconium. These metals can be alloyed with many other elements and still have the alloy retain a high affinity for oxygen.

Figure 8:
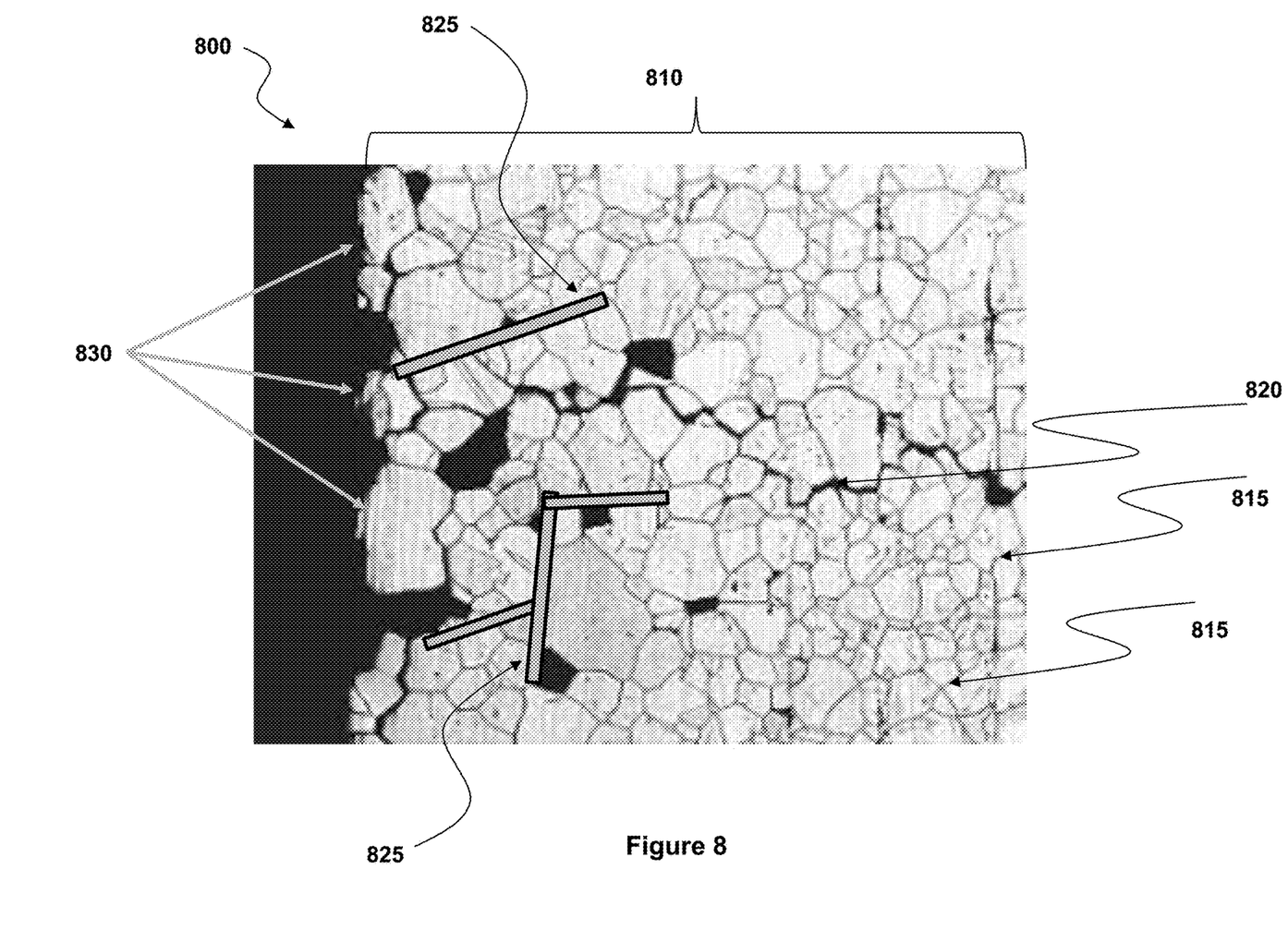
FIG. 8 illustrates part of the cross-section of a fiber, at and beneath that surface, according to one embodiment of the present invention.

In some embodiments, the chosen metal is placed at the entrance to the grain boundaries of the fiber and driven into those boundaries to a depth of several microns from the surface of the fiber. FIG. 8, a partial cross-sectional view through a fiber 800 shows one edge of the fiber surface 830 to the left and the chosen metal 825 present at two of the entrances of and penetrating well into the depths of a connected series of grain boundaries 815. Corrosion widened grain boundaries 820 are also shown in this illustrative drawing. Of course, in an actual fiber, the entire surface of the fiber, all of the grain boundary entrances, and all of the grain boundaries within several microns of the fiber surface would be sealed at the same time. The chosen metal 825 would penetrate from the edge of the fiber at the left of the figure, along all of the grain boundaries, and well into the depths of the fiber. This structure can be created by coating the chosen metal onto the outer surface 830 of the fiber and then heating the coated fiber in an inert atmosphere (such as argon) to allow some or all of the chosen metal to diffuse from the surface at least 1 micron, and typically 2-5 microns into the grain boundaries. The temperature of the diffusion process must be high enough, and the duration of the diffusion process must be long enough, to allow the chosen metal to penetrate into the fiber to the desired depth. Often, this diffusion process will require several hours. The exact time required for the diffusion will depend on the fiber material, the size of the grains, the openness of the grain boundaries, and the temperature at which the diffusion is conducted.

Otherwise, if the diffusion penetration is shallow (if it is less than 1 micron, and probably even if it is less than several microns), then, when the fiber is operated for many thousands of hours at high temperatures (above 1000 C and especially when above 1500 C), oxygen will be able to diffuse from the surface of the fiber through the parts of the grain boundaries that have been sealed, or through the grains at the surface, and, thereby, around the parts of the grain boundaries that have been sealed. Once past the sealed part of the grain boundaries, oxygen from the surface would attack the unsealed grain boundaries and weaken the fiber.

Figure 9:
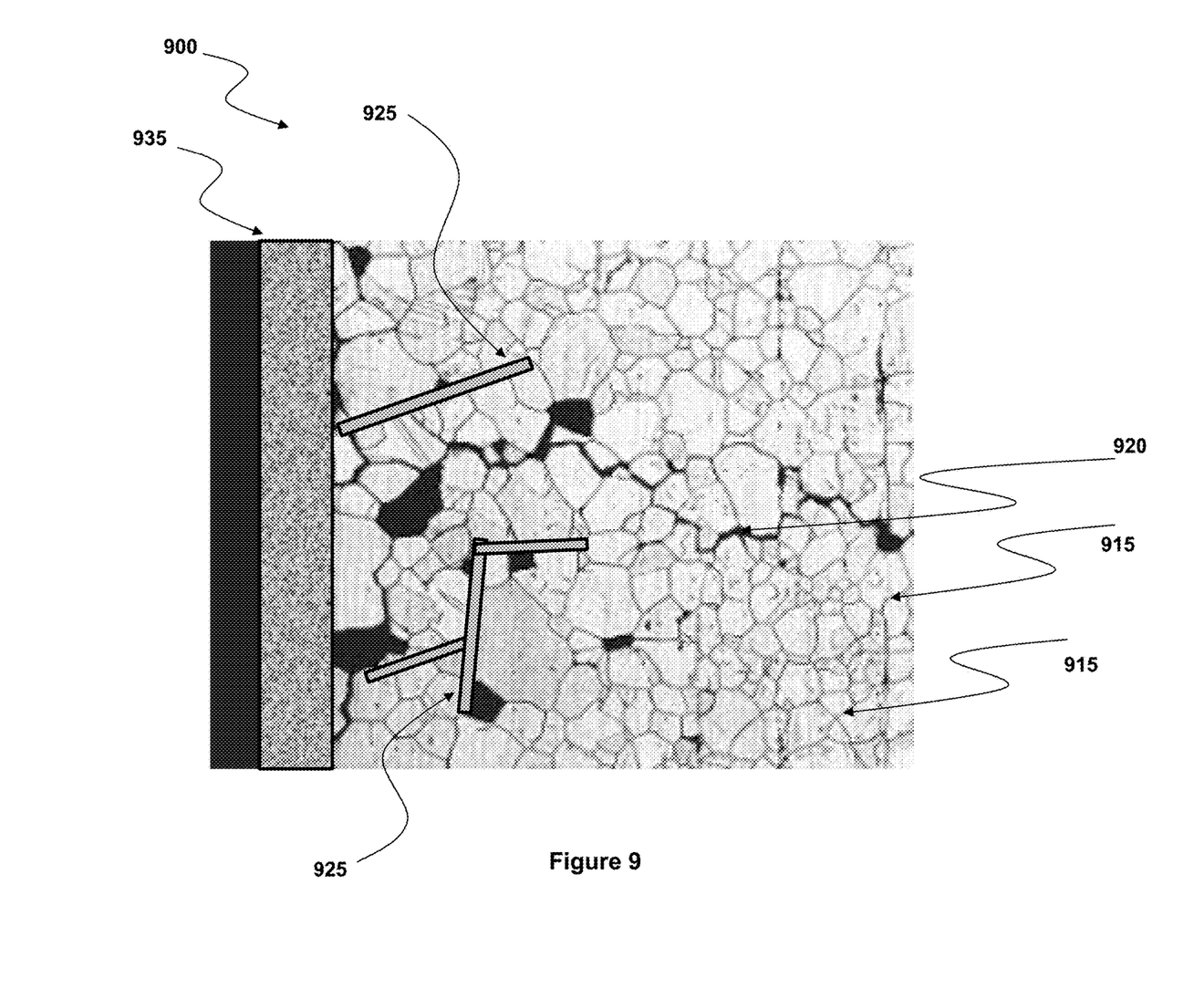
FIG. 9 illustrates part of the cross-section of a fiber, at and beneath that surface, according to one embodiment of the present invention.

In the embodiment illustrated in FIG. 9, metal 925 is first deposited on the surface (on the left hand side of the drawing) of fiber 900 and then driven into and along grain boundaries 915, to seal boundaries internally, before a metal oxide layer 935 is deposited on the surface of the fiber, sealing entrances to those grain boundaries.

Figure 10:
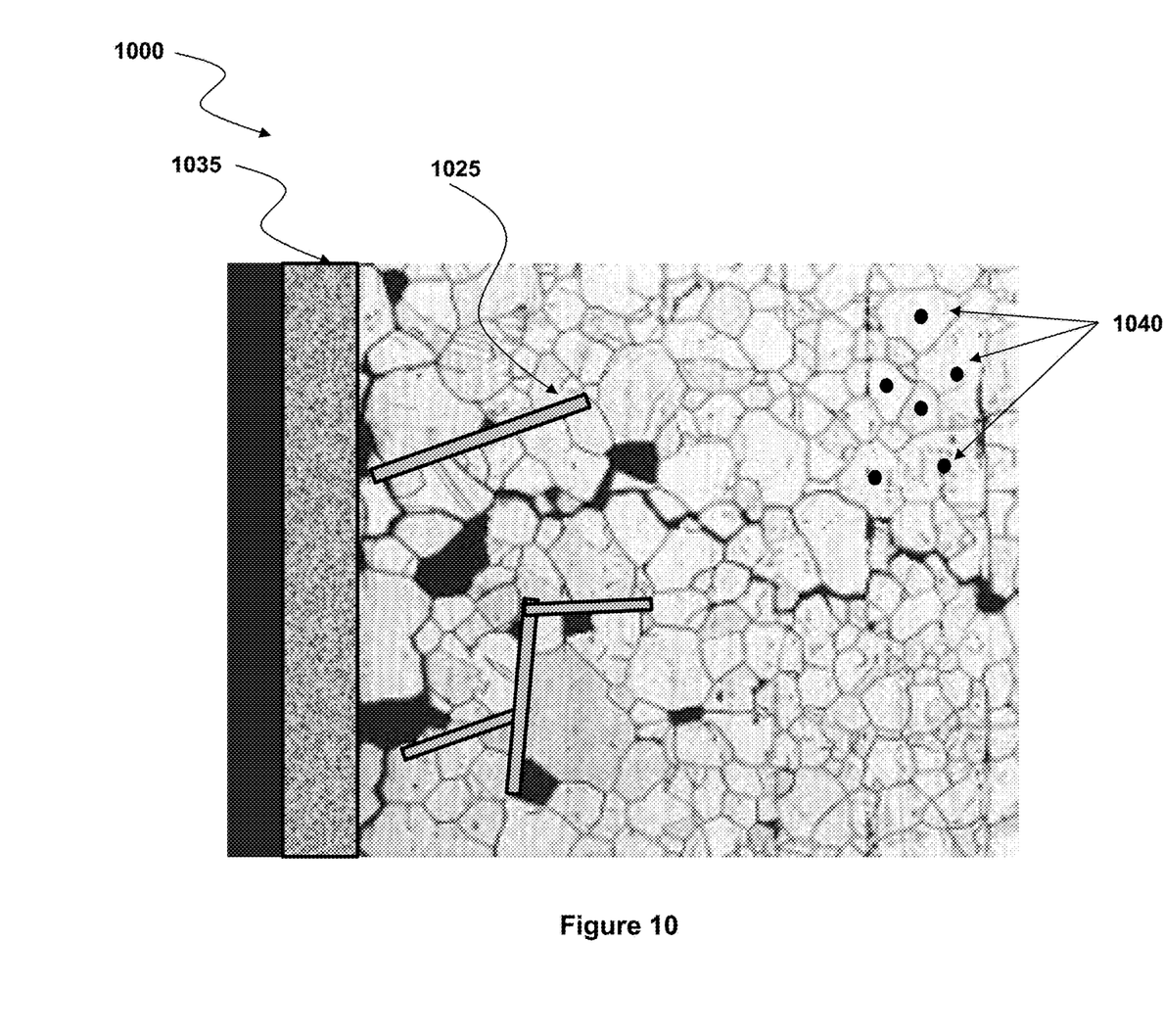
FIG. 10 illustrates part of the cross-section of a fiber, at and beneath that surface, according to one embodiment of the present invention.

FIG. 10 is an illustration of a cross section of a fiber 1000, roughly corresponding to fiber 400 in FIG. 4, but showing the fiber surface on the left hand side of the figure, and depicting the atoms of the chosen metal 1025, incorporated as a dilute impurity into the bulk of the fiber material, as dots 1040 inside a few of the crystallite grains in the bulk fiber material, for simplicity. Of course, in reality, an impurity would be distributed throughout the crystallites of the fiber, with a concentration and distribution that depends on the exact conditions of the process for growing the fiber and under which the impurity is introduced. The addition of impurity atoms within the crystallites is independent of the sealing of the grain boundaries (1025) and the presence of a sealing layer (1035) on the surface of the fiber.

In applications of particular interest to the present invention, the stable surface oxide formed in embodiments of the present invention must not only have a melting temperature significantly greater than the melting temperature of the fiber or at least significantly greater than the highest temperature required by the application. It must also have a close match to the coefficient of thermal expansion of the fiber, and must also provide a strong diffusion barrier to protect the fiber at high temperatures for many thousands of hours against diffusion of oxygen, water vapor, or nitrogen from the air outside of the fiber to the bulk material inside. Beryllium, titanium, zirconium, aluminum, and hafnium oxides and the oxides of these metals, or combinations of these metals, alloyed with silicon are all examples of materials that meet these requirements.

With respect to FIG. 5, the flowchart showing steps of a method according to some embodiments of the present invention, it should be noted that in step 504, the fiber must be held at a first high temperature for a sufficiently long duration in an inert atmosphere (eg. Ar) to allow the metal to diffuse into the fiber, into and along the grain boundaries, to a depth great enough to achieve the desired results. Depending on the fiber material, its internal structure, and the temperature used for the diffusion, typically several hours will be required to achieve a diffusion depth into the fiber of at least 1 micron.

Figure 11:
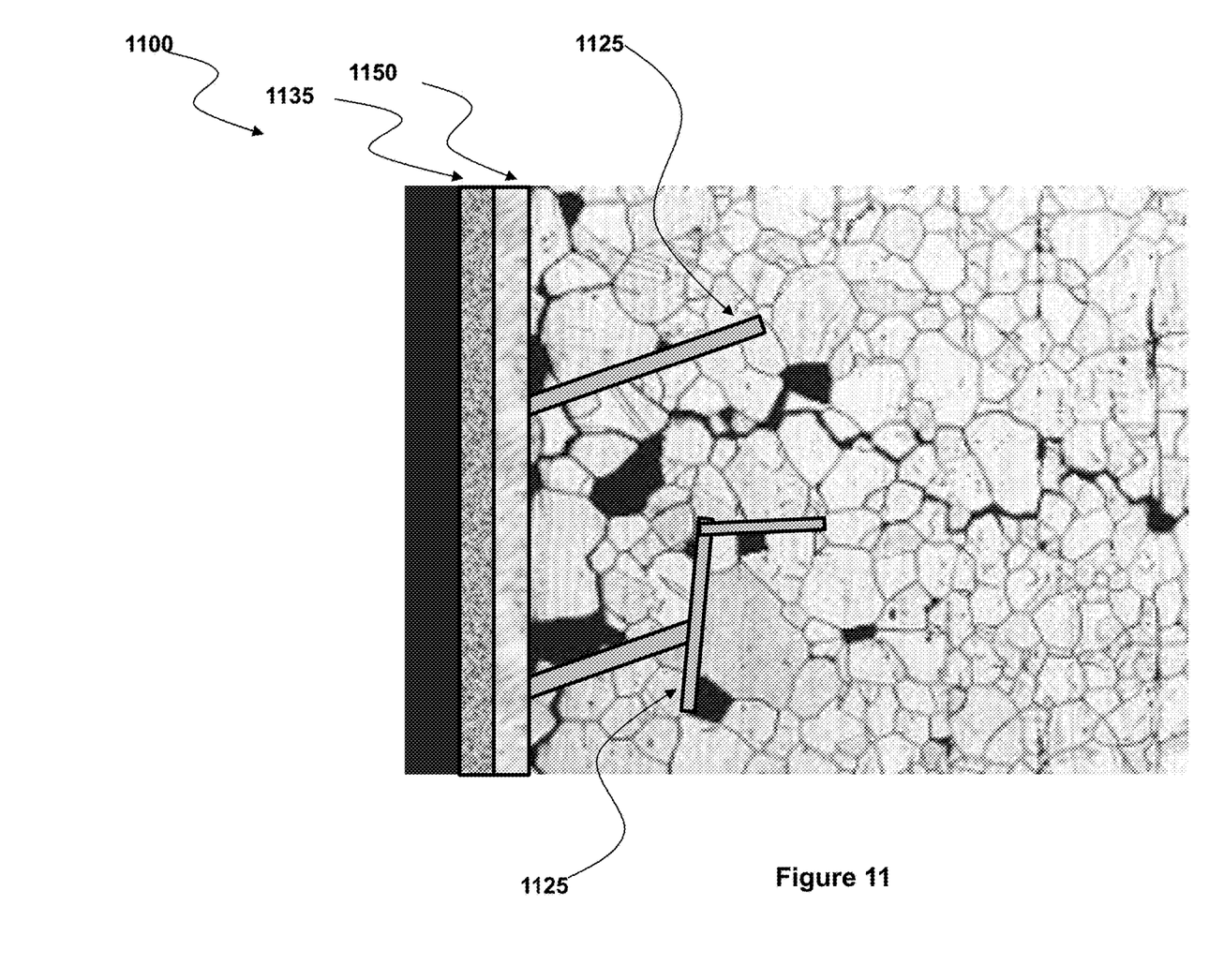
FIG. 11 illustrates part of the cross-section of a fiber, at and beneath that surface, according to one embodiment of the present invention.

FIG. 11 illustrates an embodiment corresponding to that shown in FIG. 6. A thin layer of silicon 1150 is shown on the surface of the fiber 1100. As before, depending on the exact temperature used during the diffusion process, this thin layer of silicon will act as a barrier layer and minimize the amount of the first metal that diffuses into the crystalline grains at the surface of the fiber during the diffusion step. Depending on the temperature of the diffusion process, some of the silicon will also alloy with the first metal. Also shown are several grain boundaries 1125 that have been sealed, and coating 1135, comprising a metal with high oxygen affinity, or an oxide of a metal or metal alloy with high oxygen affinity.

In one embodiment of the process described above, the second metal or metal alloy, when oxidized, forms a dense diffusion barrier at the surface of the fiber and at the entrance to the grain boundaries (which have been previously sealed).

As described earlier, for the particular case where the metal Be was used, the temperature chosen for converting the oxide of a metal, combination of metals, or combination of metals alloyed with silicon is critical. When the coated fiber cools to room temperature, the oxide coating is likely to shrink more than the fiber, placing the coating in tension and the fiber in compression. At operating temperatures encountered above the temperature of the oxidation process, the oxide coating will likely expand more than the fiber. The oxide will be in compression and the fiber will be in tension. It is important to choose the temperature at which the oxidation is done so that the tensile strength of the oxide is not exceeded at room temperature and the compressive strength of the oxide is not exceeded at high operating temperatures.

It should in summary be appreciated that the improvement to fiber properties provided by embodiments of the present invention is achieved not just at the fiber surface but by preventing oxygen or nitrogen from attacking the fiber along grain boundaries that reach to depths of several microns within the fiber.

CONCLUSION

Embodiments described herein provide various benefits. More specifically, embodiments prevent or at least greatly reduce fiber degradation at high temperatures by incorporating into the fibers a metal that attracts and bonds with impurities including oxygen more strongly than the material of the fiber does, while preventing too much diffusion of the metal into the bulk fiber material. This results in effectively removing or immobilizing these impurities present within the fiber material, preventing oxygen or nitrogen from entering the fibers from the surrounding environment, and preventing oxygen or nitrogen from attacking the fiber at its grain boundaries. For some fiber compositions, like carbon or silicon-carbide fibers, the metal atoms can also form metal carbide complexes that can pin the grain boundaries and directly strengthen and/or toughen the fibers. Pinning the grain boundaries can also improve the creep resistance of the fiber under stress, especially at high temperatures.

Some embodiments seal the surface of the fiber as well as the entrances to the grain boundaries to prevent oxygen, nitrogen and water vapor from the local environment around the fiber from entering the fiber.

Although the present invention has been described with respect to embodiments thereof, these particular embodiments are merely illustrative, and not restrictive. Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A fiber comprising:
a bulk material comprising one or more materials selected from the group consisting of carbon, silicon, boron, silicon carbide, and boron nitride; and
a metal or metal alloy whose affinity for oxygen is greater than the affinity for oxygen of any of the one or more materials;
wherein at least a first portion of the metal or metal alloy is present at the entrance to grain boundaries at the surface of the fiber and within the fiber to a depth of at least 1 micron from the fiber surface.

2. The fiber of claim 1,
wherein the metal or metal alloy comprises a metal selected from the group consisting of beryllium, titanium, aluminum, hafnium and zirconium.

3. The fiber of claim 1,
wherein the metal alloy comprises silicon alloyed with one or more of beryllium, titanium, aluminum, hafnium and zirconium.

4. The fiber of claim 1, wherein at least a second portion of the metal or metal alloy is present at or near a surface of the fiber in an oxidized form, providing a diffusion barrier that blocks oxygen and nitrogen from entering the fiber through the surface.

5. The fiber of claim 4, wherein the oxidized form of the second portion of the metal or metal alloy is a metal-silicon oxide.

6. The fiber of claim 4, additionally comprising a layer of silicon at the surface of the fiber, the layer of silicon being positioned between the fiber and the second portion of the metal or metal alloy.

7. The fiber of claim 1 wherein the metal is present in the bulk material as a dilute impurity, at a concentration of less than 5%.

* * * * *